(12) United States Patent
Aizenberg et al.

(10) Patent No.: US 6,477,554 B1
(45) Date of Patent: Nov. 5, 2002

(54) CIRCUIT AND METHOD FOR COMPUTING A FAST FOURIER TRANSFORM

(75) Inventors: Yair Aizenberg, Tinton Falls, NJ (US); Daniel Amrany, Ocean Township, NJ (US); Yue-Peng Zheng, Ocean Township, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/398,636

(22) Filed: Sep. 17, 1999

(51) Int. Cl.[7] .............................................. G06F 17/14
(52) U.S. Cl. ...................................................... 708/404
(58) Field of Search .................................. 708/403–404

(56) References Cited

U.S. PATENT DOCUMENTS

| | | | | |
|---|---|---|---|---|
| 4,899,301 A | * | 2/1990 | Nishitani et al. ........... 708/404 |
| 5,093,801 A | * | 3/1992 | White et al. ................. 708/404 |
| 5,297,070 A | * | 3/1994 | Hua et al. .................... 708/404 |
| 5,717,620 A | * | 2/1998 | Williams ...................... 708/404 |
| 5,951,627 A | * | 9/1999 | Kiamilev et al. ........... 708/404 |

\* cited by examiner

*Primary Examiner*—Tan V. Mai
(74) *Attorney, Agent, or Firm*—Thomas, Kayden, Horstemeyer & Risley (57) ABSTRACT

A process circuit is disclosed for computing a fast Fourier transform (FFT). In one embodiment, the processing circuit includes a memory device, a multiplier, a detector, a state machine, and a circuit for performing the 2's compliment of a coefficient. The memory storage device stores data values and coefficient (or twiddle) values. The detector integrates a date pointer with the state machine. The detector is designed to identify the symmetry lines (by memory address). The state machine, when notified by the detector that a line of symmetry has been encountered, appropriately adjusts either the coefficients, the imaginary sign, or the real sign for input to a multiplier.

23 Claims, 8 Drawing Sheets

CIRCUIT AND METHOD FOR COMPUTING A FAST FOURIER TRANSFORM

BACKGROUND OF INVENTION

1. Field of the Invention

The present invention generally relates to digital signal processors, and more particularly to a method and processing circuit for computing a fast Fourier transform (FFT) in a digital signal processor.

2. Discussion of the Related Art

As is known, a nonperiodic signal f(t) can be represented in terms of exponential functions over the entire real line from $-\infty$ to $+\infty$. To be valid for all time, the signal must be represented by a continuous sum of exponential functions with frequencies lying in the interval $(-\infty, \infty)$. The Fourier transform is a method of expressing a given signal in terms of such a continuous set of exponential components of frequency. The increasing use of digital methods for computational aids and for signal processing applications has resulted in an emphasis on discrete Fourier transforms (DFTs) that model Fourier transforms. A DFT is defined as a sequence of N complex valued samples in the frequency domain.

Computation of the DFT requires $N^2$ multiplications and the resulting computation time becomes excessive when N becomes large. Such a computation can be represented by $R_i = C_i$ Op $D_j$, where Op is an arithmetic operation, $C=\{1, 2, 3, -3, -2, -1\}$ (a symmetrical coefficient set), $D=\{\ldots D_j \ldots\}$, and $R=\{\ldots R_i \ldots\}$. A traditional approach to the problem is to pre-store all coefficient values, $C_i$, in memory, for each i read $C_i$ and $D_j$, then solve for $R_i$ as follows:

i=1, j=1, N=6;
loopN{read C[j], read D[i], R[i]=C[j]OpD[i], i++, j++}.

An improved approach to the problem would pre-store only coefficients $C'=\{1, 2, 3\}$ and solve for R in two stages as follows:

i=1, j=1, N=6;
loopN/2{read C'[j], read D[i], R[i]=C'[j]OpD[i], i++, j++};
i=1, j=3;
loopN/2{read C'[j], read D[i], R[i]=-C'[j]OpD[i], i++, j--}.

It is readily apparent that the improved computation saves coefficient space at the cost of program space and processing time.

The key to more efficient computational methods is to make use of as much symmetry of the complex exponential as possible before the multiplications are performed.

The symmetry of the complex exponential makes FFTs possible. A FFT is an algorithm which enables the user to compute a DFT with a minimum of computational time. The algorithms are fast because they reuse the same roots of unity many times and thus minimize the number of multiplications necessary to compute the DFT. This reuse of the roots of unity reduces the complexity of the operation to N $\log_2$ N. The net savings in computational time becomes appreciable for large N. For example, the computational time required for a one thousand twenty four point DFT with direct evaluation is one hundred times greater than that using the Cooley-Tukey FFT formulation. However, FFT algorithms require considerable memory, and memory access delay time becomes a limiting factor when high performance is desired.

In this regard, the FFT processor may generally be characterized as a digital processor which repetitively performs the basic computations:

AW+B; AW−B, where A and B are complex digital words, each initially associated with a different one of N digital samples, the frequency spectrum of which is to be analyzed, and W is a complex digital word which serves as a weighting coefficient (also known as a twiddle factor). The above computations can be performed by processing such digital words in parallel, as mentioned above, using a complex multiplier to perform the AW portion of the calculation, a storage means for storing such portion of the calculation, and a complex parallel adder and subtractor for adding and subtracting the stored portion of the calculation to and from, respectively, the B portion of the calculation.

Unfortunately, in FFT processing, global memories are relatively slow and heavily loaded due to their shared nature. Some of the loading is the result of the memory required to perform the FFT evaluation. Direct evaluation of a five hundred twelve point FFT requires the storage of complex data values and complex coefficients or twiddle factors for each discrete frequency evaluated.

Accordingly, there is a desire to provide improved efficiency in storing and retrieving coefficients for computing FFTs that reduces the memory storage capacity requirements and coefficient memory access delays in the prior art.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a processing circuit and method for computing a FFT. The present invention reflects the recognition that memory space is at a premium and excessive reads from memory consume excessive amounts of time in waiting for the memory storage device to correctly index the coefficient memory locations required in computing FFTs. Accordingly, the circuit of the present invention is specifically designed to reduce the memory requirements for the storage of symmetrical coefficients. The suggested circuit and method enables the following computation upon pre-storing only $C'=\{1, 2, 3\}$:

i=1, j=1, N=6;
loopN{read C'[j], read D[i], R[i]=C'[j]OpD[i], i++, j++}.

This implementation has the advantage of reducing the required coefficient storage space, without the penalty in program space and processing time of the prior art implementations.

In accordance with the invention, the processing circuit includes a memory device, a multiplier, a detector, a state machine, and a circuit for performing the 2's complement of a coefficient. The memory storage device stores data values and coefficient (or twiddle) values. The detector integrates a data pointer with the state machine. The detector is designed to identify the symmetry lines (by memory address). The state machine, when notified by the detector that a line of symmetry has been encountered, appropriately adjusts either the coefficients, the imaginary sign, or the real sign for input to a multiplier. In this way, for first order symmetry, coefficients representing only one eighth of the unit circle are required to be stored in order to enable computation of the entire FFT and the inverse FFT. For DFT coefficients with higher orders of symmetry, less of the coefficients on the unit circle need to be stored.

In accordance with a preferred embodiment of the invention, the circuit includes a detector in the form of a data pointer and a state machine driven by data address comparison. The detector determines the portion of the unity circle that the data pointer is virtually pointing to and increments the state machine accordingly. The address pointer increment function is also triggered in the process. The state machine keeps track of which "slice" the address pointer is in by changing states when a slice boundary is encountered. The arithmetic operation is modified by the state machine from a combination of multiplexer select signal processors and add/subtract signals. In this regard, a first multiplexer is disposed to retrieve a value to output to the second input of the first adder, wherein the retrieved value may be retrieved from the data memory, or from the output of the first adder. In similar fashion, a second multiplexer is disposed to retrieve a value to output to the second input of the second adder, wherein the retrieved value may be retrieved from various locations to route to the second adder. Specifically, this second multiplexer may route data from the data memory, the output of the first adder, or from the output of the second adder. Additional multiplexers may be provided to retrieve both real and imaginary components of data values and coefficient values to controllably route either the real portion or the imaginary portion into various arithmetic units of the circuit. In this way, complex numbers may be controllably manipulated, multiplied, or added to effectively carry out the computation of the present invention.

Further, an address controller is provided which controls the addressing of both the data memory and coefficient memory for both read and write operations. Therefore, what is provided is a more efficient circuit for processing FFTs with symmetrical coefficients.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

Figure 1:
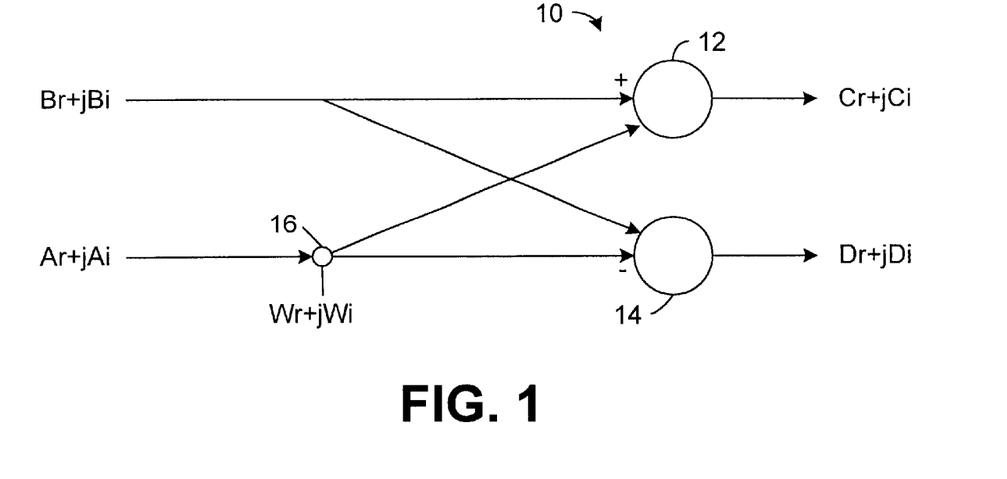
FIG. 1 is a diagram that illustrates a single complex butterfly operation.
Figure 2:
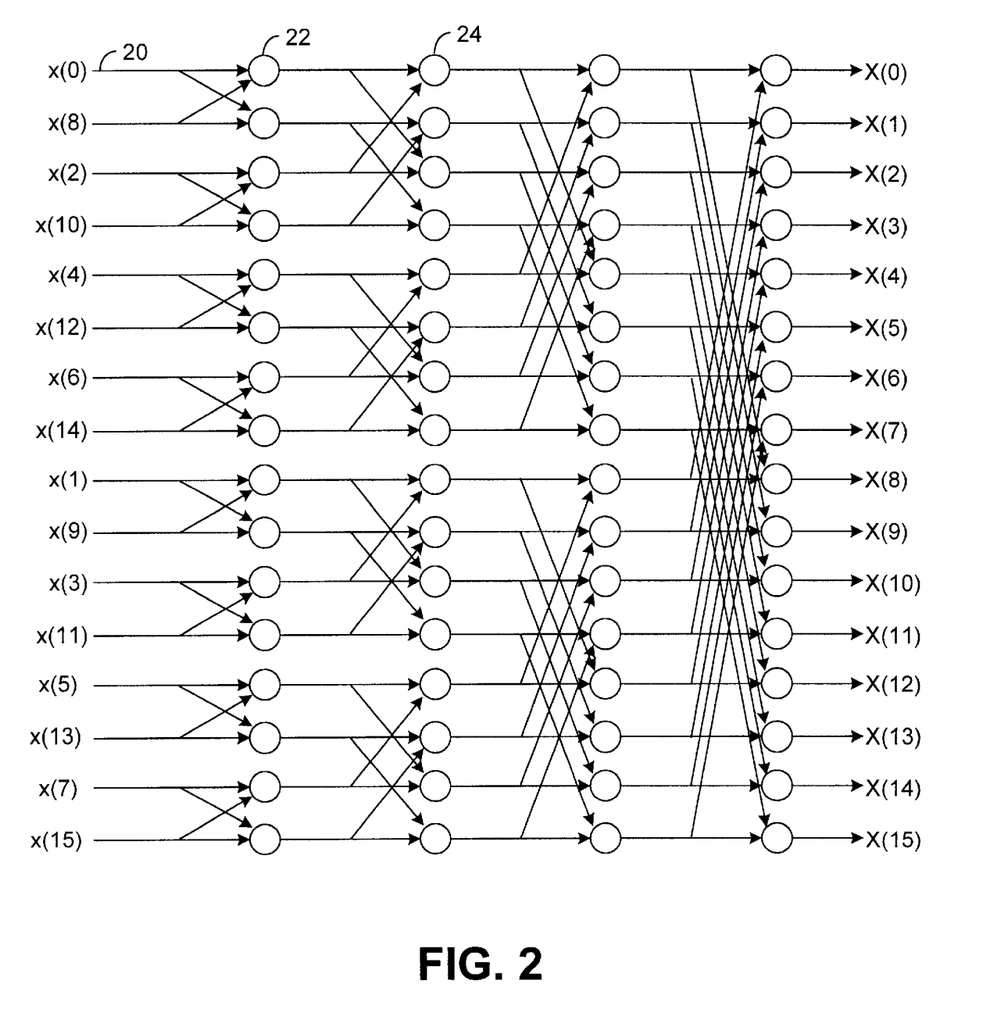
FIG. 2 is a diagram that illustrates a plurality of complex butterfly operations that may be executed in computing a sixteen point FFT.

Turning now to the drawings, reference is now made to FIG. 1, which illustrates a single complex butterfly 10, of a type that is well known in the processing of a FFT. As is well known, the complex butterfly operation receives two complex input data values A and B, where $A=Ar+jAi$ and $B=Br+jBi$. The complex butterfly operation results in two outputs C and D, where $C=Cr+jCi$ and $D=Dr+jDi$. The operation itself includes multiplying A by a FFT coefficient value W, where $W=Wr+jWi$. As previously mentioned, this coefficient value is often referred to as a twiddle factor. The point 16 represents a multiplier which computes the product of A and W. This product is added to B to generate the first output C. Similarly, the product of A and W is subtracted from B to generate the output D. This complex butterfly operation is performed using predetermined coefficient values in a predetermined fashion, to generate output data values that represent the FFT of the input data values. FIG. 2 illustrates the layout of a number of complex butterfly operations in performing a sixteen point FFT. As is shown, a sixteen point FFT includes four stages of complex butterfly computations. As the computation of FFTs in accordance with the butterfly chart of FIG. 2 is well known, details regarding its computation need not be described herein.

Instead, the present invention is directed to a novel method and apparatus for computing a FFT in accordance with the butterfly operation of FIG. 1, such that the overall computation consumes less time and requires less memory capacity to store coefficients than the computation as performed in the prior art. As will be appreciated from the discussion that follows, the present invention relates to the storage and retrieval of symmetrical coefficients used in processing the FFT computations. By minimizing the number of stored coefficients, the system and method realize a solution that requires less computational time and memory storage capacity.

Figure 3:
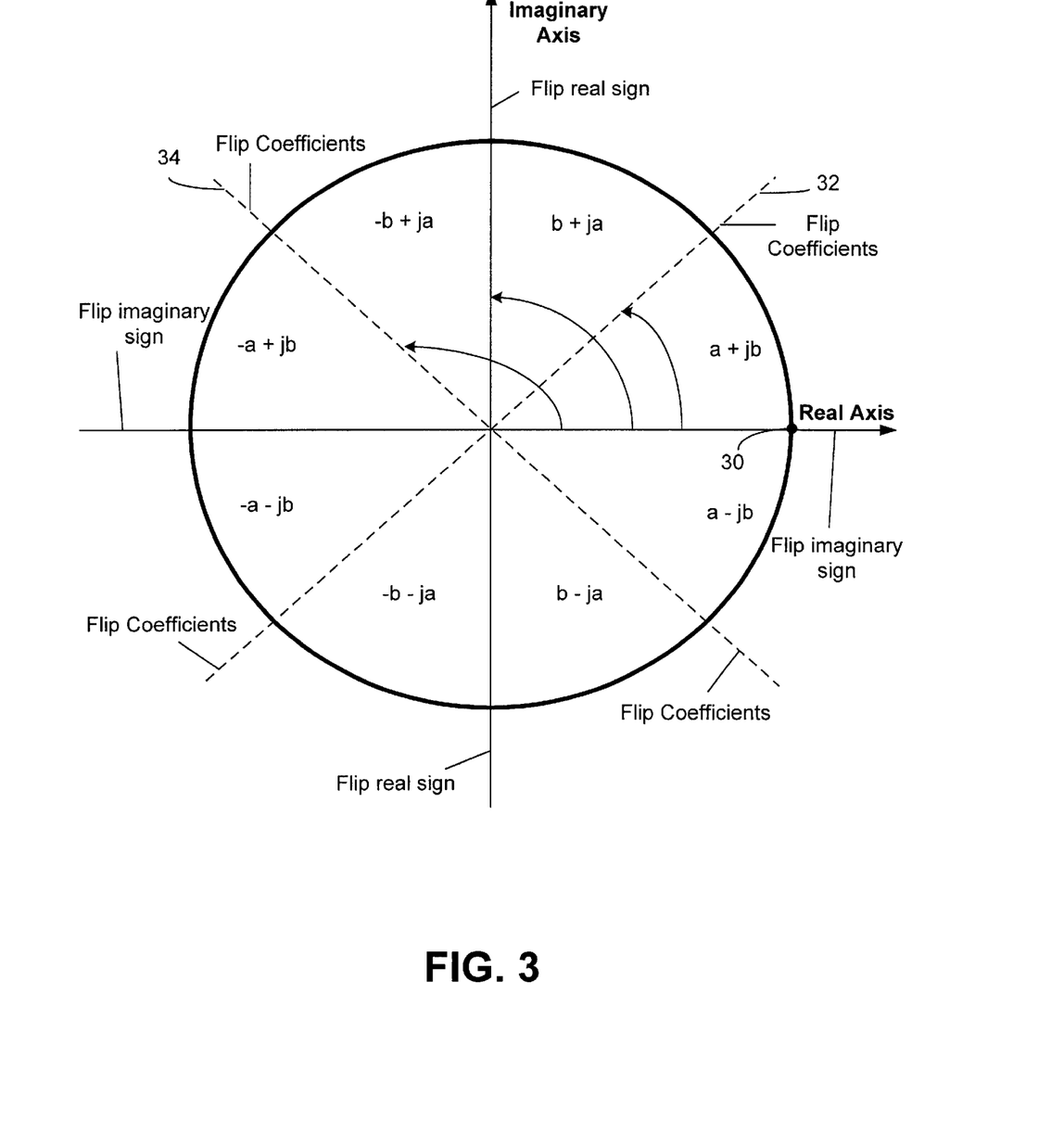
FIG. 3 is a diagram that illustrates the relationship between points on the unit complex circle.

Reference is now made to the unit complex circle depicted in FIG. 3. Traveling counter-clockwise from reference point 30 around the unit complex circle, eight slices are encountered, wherein coefficients a and b, making up complex twiddle factor W, can be used to depict the slices as a combination of the real sign, the imaginary sign and the two coefficients. By storing coefficients a and b and manipulating the real sign, the imaginary sign and the location of the coefficients within the twiddle factor, every slice of the unit complex circle can be modeled. As a result, for a set of coefficients with first order symmetry, only coefficients associated with one-eighth of the unit complex circle must be stored in order to generate the coefficients required for the evaluation of the complete FFT. Traveling counter-clockwise from reference point 30 around the complex circle, the quadrant of the circle wherein both the real sign and the imaginary sign are positive is bisected by a line 32. All points on the complex circle between reference point 30 and line 32 fall within the slice of the circle wherein points on the circle can be depicted by $W=a+jb$. Points on the complex circle between line 32 and the imaginary axis can be depicted by $W=b+ja$. Traveling further along the complex circle, the next quadrant is bisected in the same manner by line 34 wherein points on the complex circle can be depicted by $W=-b+ja$ and $W=-a+jjb$. Continuing along the complex circle in a counter-clockwise manner, the next quadrant is bisected by line 32. Points on the complex circle in this quadrant can be depicted by W=−a−jb and W=−b+ja. Proceeding in the same manner around the complex circle, the last quadrant is bisected by line 34. Points on the complex circle in this quadrant can be depicted by W=b−ja and W=a−jb. As is known in the prior art a discrete FFT can be evaluated by solving AW+B and AW−B for each of the complex data points A and B sampled. By taking advantage of the symmetry along the complex circle, a five hundred twelve point FFT can be evaluated by storing symmetrical coefficients a and b for a single slice of the complex circle as shown in FIG. 3. For a five hundred twelve point FFT the present invention results in a coefficient storage requirement reduction of 447 complex coefficients (coefficients are stored for both end points of the slice). The reduction is accomplished by repeatedly reusing the real and imaginary coefficients stored for a single slice by manipulating coefficient position, the real sign, and the imaginary sign based on the location of the data pointer along the virtual complex circle.

Figure 4:
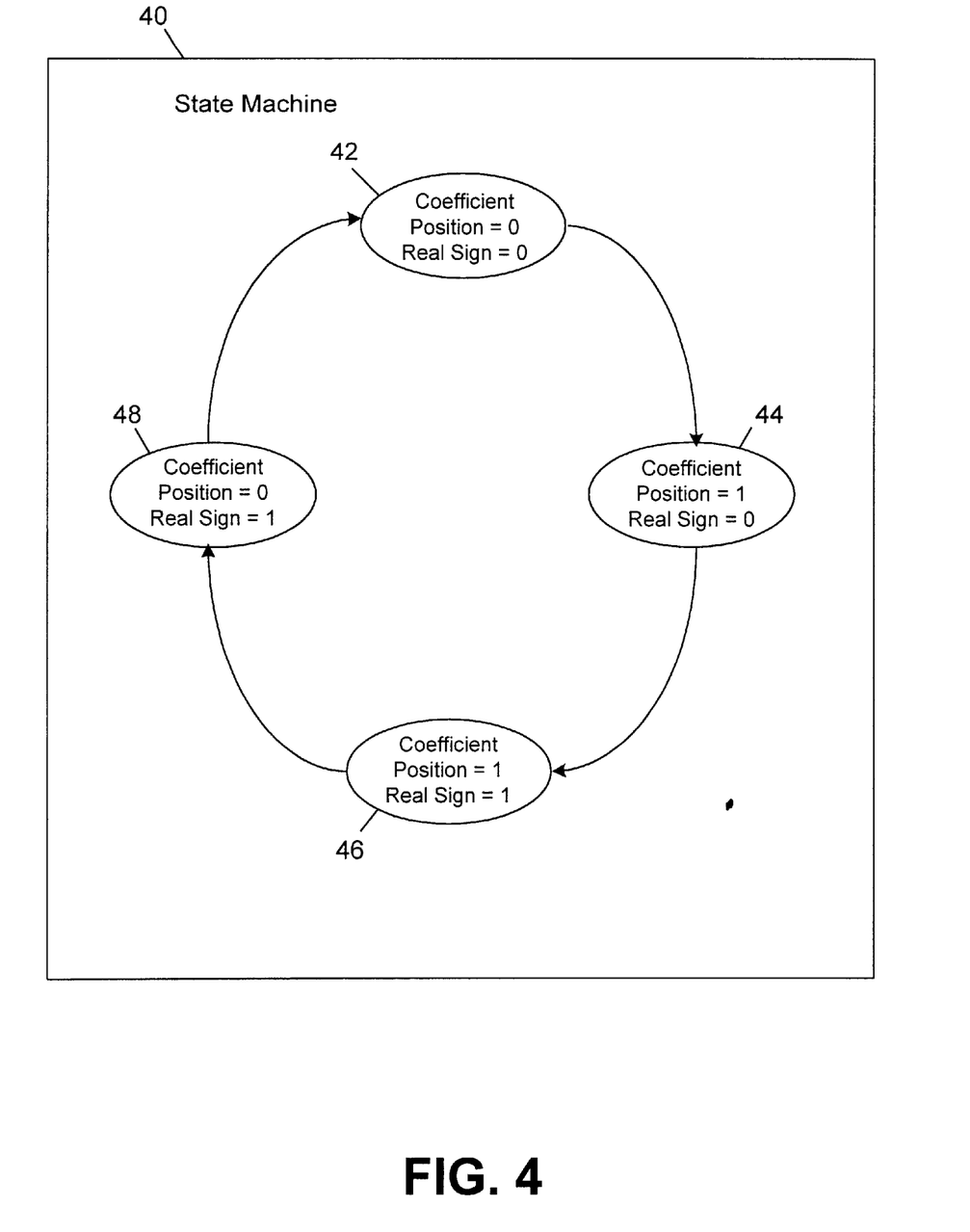
FIG. 4 is a diagram that illustrates the states in the state machine.

Reference is now made to FIG. 4, which illustrates the state machine used in processing the FFT computation. State machine 40 reveals 4 distinct states for two binary variables used to manipulate the coefficients and the real sign to construct the complex unit circle slices described above. State Zero 42 is characterized by the case where both variables are 0 and W=a+jb. State One 44 is characterized by a flip of the complex coefficients (real sign remains positive) resulting in W=b+ja. State Two 46 is characterized by a flip of the real sign resulting in W=−b+ja. State Three 48 is characterized by a flip of the complex coefficients (the real sign remains negative) resulting in W=−a+jb. The state machine returns to State Zero 42 by performing a swap of the real sign, thereby returning to the case where both variables are 0 and W=a+jb. It is readily apparent that in order to coordinate the application of state machine 40 to a five hundred twelve point FFT, the state machine will be incremented after processing the $64^{th}$, $128^{th}$, $192^{nd}$, $256^{th}$, complex data pair. In order to correctly coordinate the application of the imaginary sign in the FFT evaluation, circuitry configured to perform the 2's complement of the coefficient value is disposed before the multiply operation.

Figure 5:
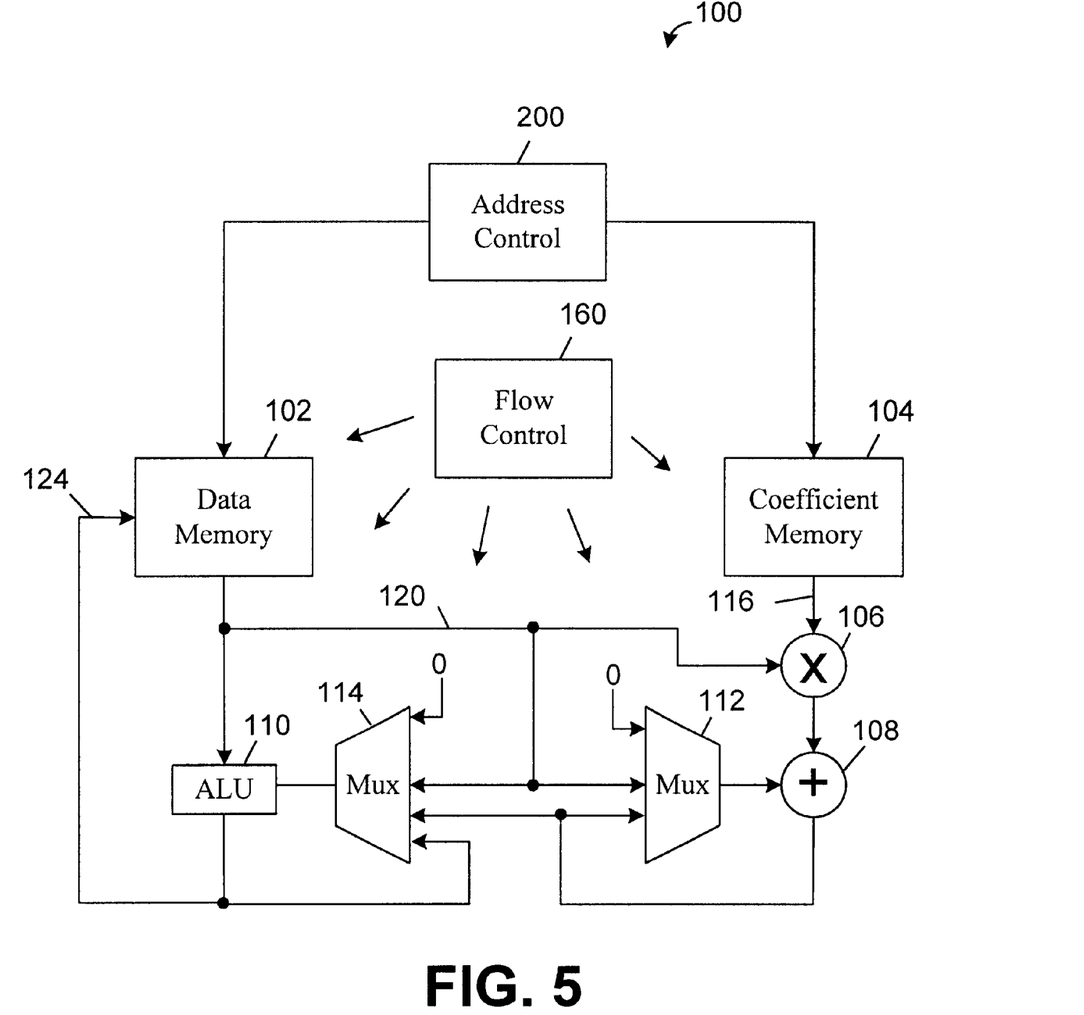
FIG. 5 is a high level block diagram illustrating a processing circuit constructed in accordance with one embodiment of the present invention.
Figure 6:
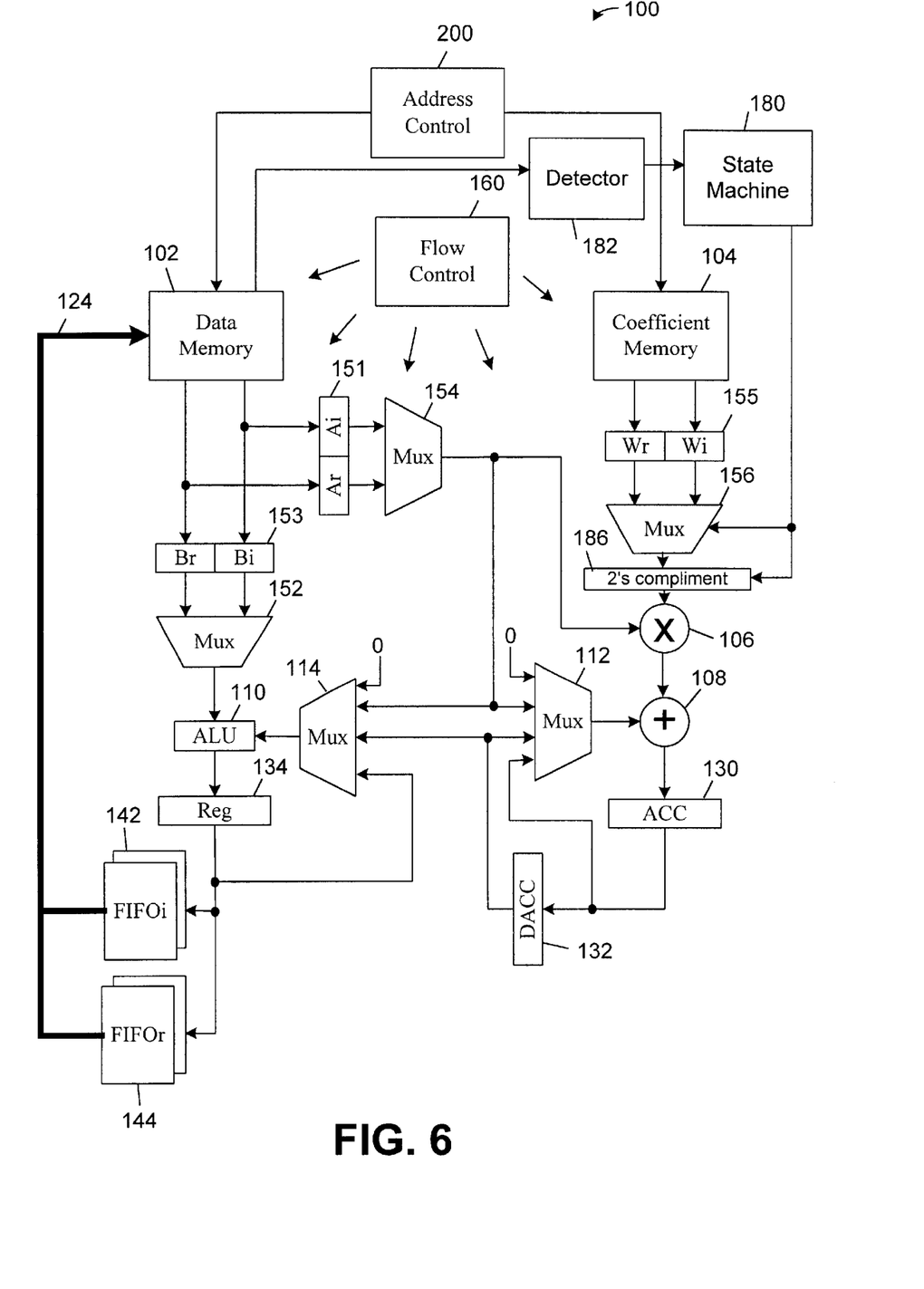
FIG. 6 is a block diagram similar to the diagram of FIG. 5, but illustrating further circuit detail, in accordance with one embodiment of the present invention.

Reference is now made to FIG. 5, which is a block diagram that illustrates fundamental components of a circuit 100 for processing a FFT computation. It should be appreciated that the particular circuit illustrated in FIGS. 5 and 6 is presented merely for purposes of illustration, and other circuits or variations of the circuit illustrated, may be implemented in a manner consistent with the invention. The circuit 100 includes two memory devices 102 and 104, which comprise a data memory 102 for storing the input data values, the intermediate computed values, as well as, the output values of the FFT. In contrast, the coefficient memory 104 maintains the predetermined coefficient (or twiddle) values that are used in connection with the various complex butterfly operations. As can be verified by the computations involved in carrying out a single complex butterfly operation, each such complex butterfly operation requires four multiply operations and eight addition and subtraction operations. Therefore, to minimize the number of clock cycles, and thereby maximize the efficiency of the processing operations, the processing circuit 100 includes a single multiplier 106, an adder 108, and an arithmetic logic unit (ALU) 110. As is readily observed from the complex butterfly structure, the coefficient W is multiplied by the second input A. Therefore, a path 116 is provided between the coefficient memory 104 and the multiplier 106. Coefficient values may be routed along this path 116 when directed to the multiplier 106 for computation. Another path 120 is provided between the data memory 102 and the multiplier 106. The input value A, which is multiplied by the coefficient value W, may be routed across this path 120. A adder 108 is disposed in communication with the output of the multiplier 106, to receive its output and add to it a second input. This input may be routed from one of several locations, including the data memory 102, as well as, the output of the adder 108 itself. To facilitate such data routing, a multiplexer 112 may be disposed in communication with the second input of adder 108.

Similarly, a second multiplexer 114 may be disposed in communication with an input for the ALU 110. This ALU 110 may have an input disposed in direct communication with the data memory 102 for receiving values directly therefrom. This value, retrieved from the data memory (the value of B for the complex butterfly operation), may be added to a second input that may be obtained from one of several locations. Specifically, the multiplexer 114 may controllably direct data from the data memory 102 (across data path 120), from the output of the adder 108, or from the output of the ALU 110 to the second input of the ALU 110. In addition, each multiplexer 112 and 114 may have an input that is grounded (or otherwise carries a value of zero), so that a zero value may be added to the first input of adder 108 and ALU 110.

In accordance with one feature of the present invention, a write-back data path 124 is provided between the output of the ALU 110 and the data memory 102. As intermediate data values of the complex FFT are computed, they are written back into the appropriate location of the data memory 102. By way of example, and again referring briefly to FIG. 2, the first data value 20 (X(0)) may be stored at a predetermined location within the data memory 102. The first intermediate value 22 that is computed in the complex butterfly processing of the FFT will preferably be stored in the same address location of the data memory 102, thereby overwriting the value of X(0). Likewise, intermediate value 24 will overwrite the intermediate value 22, as they will be stored at the same location within the data memory 102. Thus, the data memory 102 may be a small sixteen word memory for computing a sixteen point FFT. In this regard, a complex word may comprise two scalar words bytes, wherein a first scalar word byte stores the real component for each data value, and a second scalar word byte may store the imaginary component for each data value.

As should be appreciated by persons of ordinary skill in the art, various modifications and variations may be made to the circuitry described herein. For example, the processing circuit has been described as including a multiplier 106, an adder 108, and an ALU 110. In this regard, in a preferred embodiment, adder 108 is implemented as a true adder, and is not capable of performing subtraction operations. The adder 108 has been implemented in this way for purposes of circuit simplicity. The ALU 110, however, has been configured and implemented in a manner that allows it to perform subtraction operations, as well as true addition operations. Thus, it will be appreciated that an ALU could be readily substituted for the adder 108. It should also be appreciated by those skilled in the art that data memory 102 and coefficient memory 104 may be integrated into a single memory storage device wherein data values and coefficient values are managed and controlled by memory address.

It should be further appreciated from the discussion herein that the circuit computes the equation: ACC=ACC−W*A, where ACC is the value held by the accumulator 130 (see FIG. 6). Therefore, the circuit is configured to subtract the product of W*A from the accumulator output. One way that this could be implemented is by substituting an ALU in place of the adder 108. In the preferred embodiment, however, the multiplier 106 is configured so that it may invert an input. Thus, for example, the W input may be inverted, so that the product W*A results in a negative value. Accordingly, the adder 108 may perform a true addition of this negative product with the previous value of the accumulator 130 (See FIG. 6) to compute the ACC=ACC−W*A equation.

Reference is now made to FIG. 6, which shows the processing circuit of the preferred embodiment, similar to FIG. 5, but illustrating additional detail. Therefore, components which have already been discussed, need not be discussed again. What is illustrated, however, are registers, additional multiplexers, and FIFOs that are used in the write-back data path 124, as well as, a detector, a state machine, and circuitry to perform the 2's complement of a coefficient value. In the preferred embodiment of the present invention, an accumulator register 130 is provided to receive the output of adder 108. As will be appreciated, the adder 108 is a circuit device that operates asynchronously. Therefore, the accumulator 130 is a register device that may be clocked to retrieve and hold the value of the adder 108. A second accumulator 132, or delayed accumulator, may be provided to register the output of the first accumulator 130. As is illustrated, the output of the delayed accumulator 132 is directed to both multiplexers 112 and 114. Another register 134 is provided to register the output of the ALU 110.

Additional multiplexers include a third multiplexer 156, a fourth multiplexer 154, and a fifth multiplexer 152. Each of these multiplexers are illustrated as a two input, one output multiplexers, and are each configured in the same fashion. Namely, to controllably direct the real versus imaginary components of data/coefficient values for the complex arithmetic operations to be carried out. More specifically, the third multiplexer 156 is disposed to receive data read from the coefficient memory 104. The bus that is output from the coefficient memory 104 is illustrated as being input to a register 155, which illustrates both the real and imaginary components of the coefficient value W. In this regard, registers 151, 153, and 155 may be utilized to clock values read from memories 102 and 104. It will be appreciated that, in implementation, the coefficient memory may be implemented as a 32 bit memory. If so, then 16 data lines will be directed to one input of a bank of multiplexers 156, while the other 16 lines will be directed to the other input of the bank of multiplexers 156. It should be appreciated that sixteen of the data lines will carry the real component of the coefficient value (Wr) while the other sixteen lines will carry the imaginary portion (Wi) of the coefficient value W. Alternatively, the coefficient memory 104 could be implemented as a sixteen bit memory, where two sets of eight lines are directed from the output of the memory 104 to a bank of multiplexers 156. What is significant for purposes of the preferred embodiment is that the multiplexer 156 may controllably direct either the real portion or the imaginary portion of the coefficient value to the multiplier 106. In this regard, it is well known that the coefficient W is multiplied by the data value A in accordance with the following equation:

$$A*W=(Ar+jAi)*(Wr+jWi)=Ar*Wr-Ai*Wi+j*(Ar*Wi+Ai*Wr)$$

Thus, as each of the multiplication operations from the above equation are carried out, the multiplexer 156 can controllably route the real or imaginary components of the coefficient W from the coefficient memory 104 to the multiplier 106. Multiplexer 156 is controlled in the manner just described by a control signal from state machine 180. The sign of both the real and imaginary components of coefficient W are manipulated by 2's complement circuitry 186 interposed between multiplexer 156 and multiplier 106. The 2's compliment circuitry 186 is controlled by a control signal from state machine 180. State machine 180 is incremented at preset stages by detector 182 which is in communications with data memory 102. In the same way, that multiplexer 156 is configured to manipulate the real and imaginary components of the twiddle factor, multiplexers 152 and 154 are configured to controllably direct the real and imaginary components of the data values A and B to the multiplier 106, multiplexer 112, multiplexer 114, and ALU 110, as illustrated.

FIFOs 142 and 144 are also provided along the write-back data path 124. Specifically, FIFO 142 is configured as a buffer memory between the register 134 and the data path 124, for imaginary components of interim data values that are to be written back to the data memory 102. Similarly, FIFO 144 provides a buffer for interim data values that are to be written from register 134 to the data memory 102. As will be further described below, the address controller 200 controls the addresses of the data memory 102, as well as, the coefficient memory 104. Significantly, interim data values from the data memory 102, as they are computed, are written back over previously existing data values within the data memory 102. The address controller controls the memory as data is both read and written from and to the data memory 102. FIFOs 142 and 144 provide temporary storage for data values that prevents contention as data may be read from one address of the data memory 102, before it is written from the FIFOs 142 and 144 to another location in the data memory 102.

Additional flow control circuitry 160 may also be provided to provide various control signals required for proper operation of the circuit 100. For example, select lines that control the multiplexers 112, 114, 152, 154, and 156 must be generated and coordinated in proper timing and sequence to control the routing of data to and from various locations within the circuitry. As will be appreciated by persons skilled in the art, additional control signals may need to be generated, but such detail need not be described herein in order to gain an understanding of the present invention.

Although described above in connection with the computation of a five hundred twelve point FFT, it will be appreciated that the processing circuit 100 will operate equally well with a thirty two point FFT, a sixty four point FFT, a two-hundred fifty six point FFT, a one thousand twenty four FFT, as well as other size FFTs as well.

Figure 7:
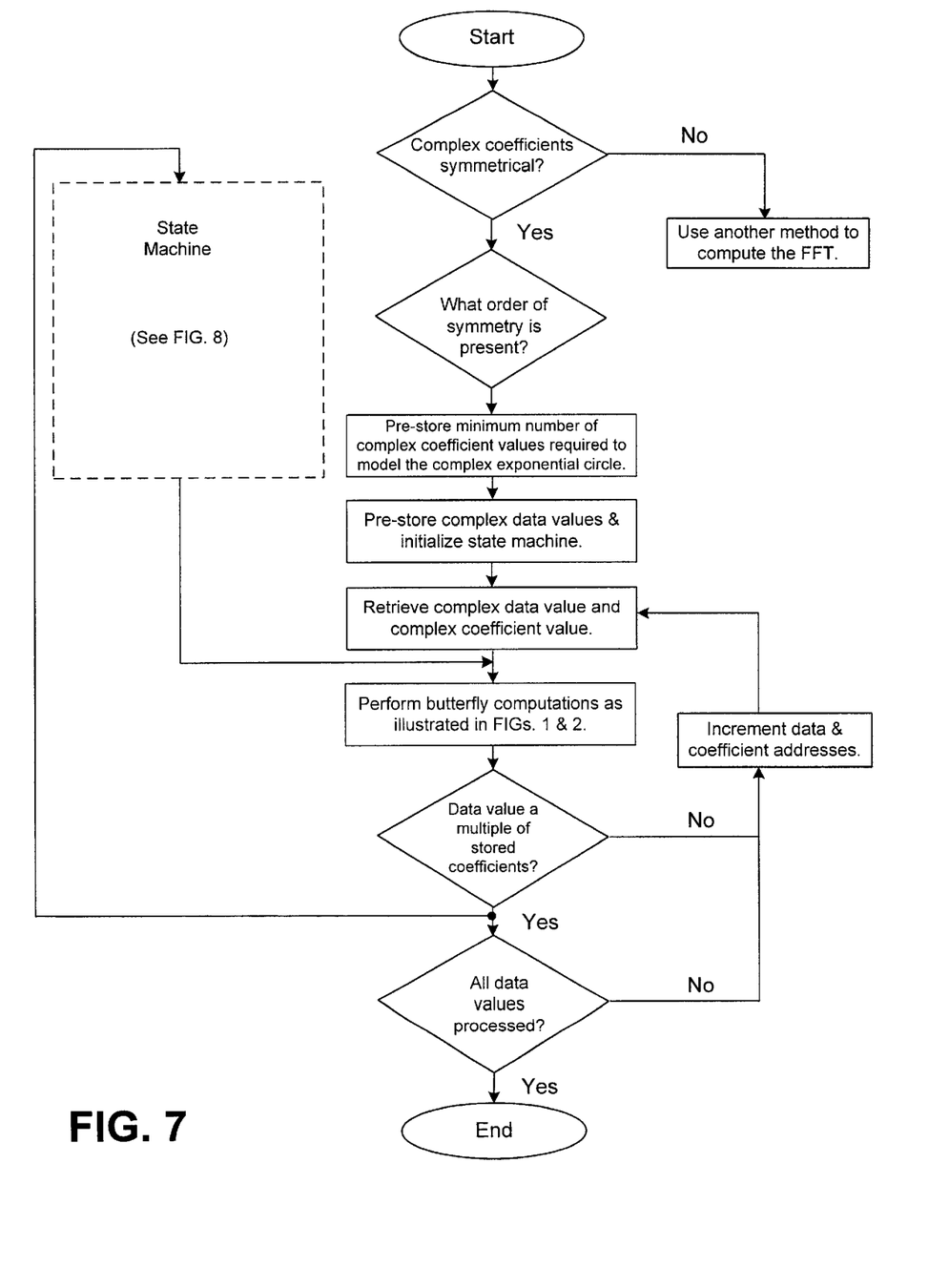
FIG. 7 is a flowchart illustrating the method for computing a FFT with symmetrical complex exponential coefficients.

Reference is now made to FIG. 7, which illustrates the process of computing a FFT with symmetrical coefficients. A preliminary step to practicing the preferred method of the present invention is the determination that the complex coefficients of the FFT of interest are symmetrical. FFTs that do not have symmetrical coefficients cannot be evaluated by the method.

First, the preferred method determines the minimum number of complex coefficient values required to model the complete complex exponential circle. For complex coefficients with one order of symmetry, only one eighth of the complex coefficients are stored. For FFTs with higher orders of symmetry, even less of the coefficient values will need to be stored in order to use the method to evaluate the FFT.

Before actual evaluation of the FFT can commence, three preliminary steps must be performed. It is significant to note that the preliminary steps can be performed in any sequence. First, the complex data values for the FFT are stored. Next, the magnitudes of the complex coefficients are stored. Last, all multiples of the number of complex coefficients actually stored that are less than or equal to the number of data values to be evaluated in the FFT are determined.

The preferred FFT evaluation and description thereof, commences at the intersection of the real axis and the complex exponential circle and traverses the circle in a counter-clockwise direction. It will be appreciated by those skilled in the art that the method could be practiced by commencing the method steps from any other transition point along the complex exponential circle as illustrated in FIG. 3.

Figure 8:
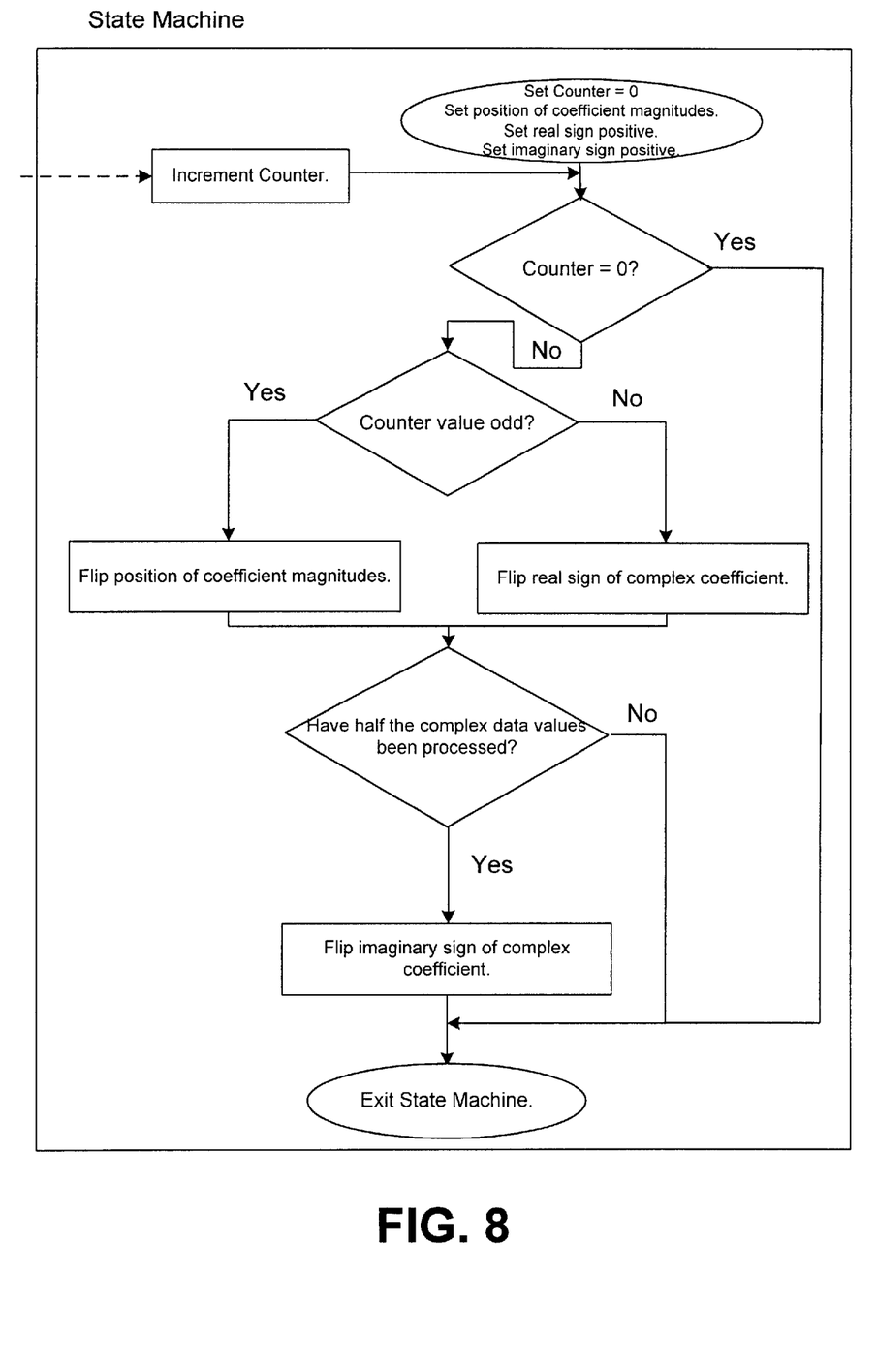
FIG. 8 is a flowchart illustrating the state machine of FIG. 7.

First, the preferred FFT evaluation initializes the state machine such that the magnitudes of the complex coefficient values are applied in the order stored and the real sign of the complex coefficient is positive (see FIG. 8). The state machine remains in this state until the butterfly computations as illustrated in FIGS. 1 and 2 have been completed for the first N complex data values and associated stored complex coefficients. Where N is number of complex coefficient values stored. Once the memory storage device processes the $N^{th}$ complex data value, the state machine counter is incremented, such that next set of butterfly computations applies the magnitudes of the real and the imaginary portions of the complex coefficient in reverse order. The state machine remains in this state until the butterfly computations have been performed for the next multiple of complex data values. Once the memory storage device processes the last of the $N^2$ complex data values, the state machine counter is incremented again. The evaluation steps described above repeat until all the complex data values have been processed.

It will be appreciated by those skilled in the art, that an alternative method of evaluating a FFT applying teachings of the present invention can be implemented by incrementing the state machine after the stored complex coefficient values have been exhausted until all data values have been exhausted.

Reference is now made to FIG. 8, which illustrates the state machine of FIG. 7. Upon initialization, the state machine sets the position of the magnitudes of the complex coefficients so that they are applied in the order stored (i.e. $W_i=a_i+jb_i$) and sets the real and imaginary signs of the complex coefficient positive. The state machine remains in this state until the evaluation process described in FIG. 7 has cycled through the first set of N data values. Upon encountering the $N^{th}$ data value, the state machine counter is incremented. When the state machine counter is odd, the state machine flips the magnitudes of the complex coefficient as stored. For the first half of the FFT data values stored, the state machine leaves the imaginary sign of the complex coefficient positive such that $W_i=b_i+ja_i$.

Upon cycling through $N^2$ data values, the state machine counter is incremented once again. When the state machine counter is even, the state machine inverts the sign of the real portion of the complex coefficient such that $W_i=-b_i+ja_i$. This process repeats until one half of the total data values stored has been evaluated. Upon encountering the midway point of the data values the state machine is incremented and the state machine inverts the sign of the imaginary portion of the complex coefficient such that $W_i=-b_i-ja_i$. This process repeats until all data values have been exhausted.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A circuit for calculating a Fast Fourier Transform (FFT) of a plurality of data values comprising:

a memory device for storing data values and coefficient values;

a first circuit configured to multiply data values and coefficient values retrieved from the memory device to provide a first result;

a second circuit configured to receive and add another value to said first result to provide a second result, wherein the second result is stored in the memory device;

a detector having an input from the memory device for monitoring the processing of data values;

a state machine in communication with the detector, wherein the input from the detector is used to increment the state machine and wherein the state machine is configured to control the processing of coefficient values through the first circuit; and means for performing the 2's complement of the coefficient values in communication with the state machine.

2. The circuit as defined as in claim 1, wherein the memory device is configured to store both real and imaginary components of data values and coefficient values stored therein.

3. The circuit as defined as in claim 1, wherein the detector is configured to increment the state machine when predetermined data value locations have been processed by the memory device.

4. The circuit as defined as in claim 1, wherein the state machine is configured to control coefficient value position, the sign of the real portion of the coefficient value, and the sign of the imaginary portion of the coefficient value for input to the first circuit.

5. A circuit for calculating a Fast Fourier Transform (FFT) of a plurality of data values comprising:

a memory device for storing data values and coefficient values;

a multiplier disposed to receive data values and coefficient values from the memory device, the multiplier being configured to multiply values retrieved from the memory device and provide the result at a multiplier output;

an adder disposed to receive data from the multiplier output, the adder being configured to add the value retrieved from the multiplier output and another value;

an arithmetic logic unit (ALU) disposed to receive data values from the memory device, the ALU being configured to add a value retrieved from the memory device with another value;

a write-back data path disposed between the ALU and the memory device configured to write data output from the ALU to the memory device;

a first multiplexer having a plurality of inputs and an output that is in communication with the adder, wherein the one of the first multiplexer inputs is disposed in communication with an output of the adder;

a second multiplexer having a plurality of inputs and an output that is in communication with the adder, wherein the one of the second multiplexer inputs is disposed in communication with an output of the ALU;

a third multiplexer having a plurality of inputs and an output that is in communication with the multiplier, wherein the inputs of the third multiplexer are disposed in communication with the memory device for processing coefficient values;

a detector having an input from the memory device for monitoring the processing of data values;

a state machine disposed between the detector and the third multiplexer, wherein the input from the detector is used to increment the state machine and wherein the state machine is configured to control the processing of coefficient values through the third multiplexer; and means for performing the 2's complement of the coefficient values output by the third multiplexer configured to be controlled by the state machine for input to the multiplier.

6. The circuit as defined as in claim 5, wherein the one of the first multiplexer inputs is disposed in communication with the memory device for processing data values.

7. The circuit as defined as in claim 5, wherein the one of the second multiplexer inputs is disposed in communication with the memory device for processing data values.

8. The circuit as defined as in claim 5, wherein the write-back data path includes a FIFO configured to provide a temporary buffer for temporarily storing data that is directed from the ALU to the memory device.

9. The circuit as defined as in claim 5, wherein the memory device is configured to store both real and imaginary components of data values and coefficient values stored therein.

10. The circuit as defined as in claim 9, wherein the detector is configured to increment the state machine when predetermined data value locations have been processed by the memory device.

11. The circuit as defined as in claim 9, further including a fourth multiplexer disposed between the first multiplexer and the memory device, configured to controllably direct real and imaginary components of data values read from the memory device to one input of the first multiplexer.

12. The circuit as defined as in claim 11, wherein the state machine is configured to control data value position, the sign of the real portion of the data value, and the sign of the imaginary portion of the data value for input to the multiplier.

13. The circuit as defined as in claim 9, wherein the state machine is configured to control coefficient value position, the sign of the real portion of the coefficient value, and the sign of the imaginary portion of the coefficient value for input to the multiplier.

14. A circuit for calculating a fast Fourier transform (FFT) of a plurality of data values comprising:

a data memory for storing data values;

a coefficient memory for storing coefficient values;

a multiplier disposed to receive data values and coefficient values from the data memory and the coefficient memory, the multiplier being configured to multiply values retrieved from the data memory and the coefficient memory and provide the result at a multiplier output;

an adder disposed to receive data from the multiplier output, the adder being configured to add the value retrieved from the multiplier output and another value;

an arithmetic logic unit (ALU) disposed to receive data from the data memory, the ALU being configured to add a value retrieved from the data memory with another value;

a write-back data path disposed between the ALU and the data memory configured to write data output from the ALU to the data memory;

a first multiplexer having a plurality of inputs and an output that is in communication with the adder, wherein the one of the first multiplexer inputs is disposed in communication with an output of the adder;

a second multiplexer having a plurality of inputs and an output that is in communication with the adder, wherein the one of the second multiplexer inputs is disposed in communication with the coefficient memory for processing coefficient values;

a detector having an input from the data memory for monitoring the processing of data values;

a state machine disposed between the detector and the third multiplexer, wherein the input from the detector is used to increment the state machine and wherein the state machine is configured to control the processing of coefficient values through the third multiplexer; and means for performing the 2's complement of the coefficient values output by the third multiplexer configured to be controlled by the state machine for input to the multiplier.

15. The circuit as defined in claim 14, wherein the one of the first multiplexer inputs is disposed in communication with the data memory for processing data values.

16. The circuit as defined in claim 14, wherein the one of the second multiplexer inputs is disposed in communication with the data memory for processing data values.

17. The circuit as defined in claim 14, wherein the write-back data path includes a FIFO configured to provide a temporary buffer for temporarily storing data that is directed from the ALU to the data memory.

18. The circuit as defined in claim 14, wherein the data memory is configured to store both real and imaginary components of data values.

19. The circuit as defined in claim 14, wherein the coefficient memory is configured to store both real and imaginary components of coefficient values.

20. The circuit as defined in claim 19, wherein the detector is configured to increment the state machine when predetermined data value locations have been processed by the data memory.

21. The circuit as defined in claim 19, further including a fourth multiplexer disposed between the first multiplexer and the data memory and configured to controllably and independently direct real and imaginary components of data values read from the data memory to one input of the first multiplexer.

22. The circuit as defined in claim 21, wherein the state machine is configured to control data value position, the sign of the real portion of the data value, and the sign of the imaginary portion of the data value for input to the multiplier.

23. The circuit as defined in claim 19, wherein the state machine is configured to control coefficient value position, the sign of the real portion of the coefficient value, and the sign of the imaginary portion of the coefficient value for input to the multiplier.

* * * * *